(12) United States Patent
Mashburn et al.

(10) Patent No.: US 6,253,760 B1
(45) Date of Patent: Jul. 3, 2001

(54) BARBECUE DEVICE

(76) Inventors: James Mashburn, 1201 E. Hill St., Long Beach, CA (US) 90802; Jerry Mashburn, 1201 Hill St., Long Beach, CA (US) 90802

( * ) Notice: Subject to any disclaimer, the term of this patent is extended or adjusted under 35 U.S.C. 154(b) by 0 days.

(21) Appl. No.: 09/573,924

(22) Filed: May 18, 2000

(51) Int. Cl.[7] .................................................. A47J 37/00
(52) U.S. Cl. ...................... 126/41 R; 126/25 R; 16/343; 16/352
(58) Field of Search ................................ 126/41 R, 25 R, 126/42, 9 R, 40, 50; 220/333, 335; 16/357, 358, 359, 360, 253, 365, 366, 369, 370, 343, 352

(56) References Cited

U.S. PATENT DOCUMENTS

| | | | |
|---|---|---|---|
| 1,059,221 | * | 4/1913 | Saylor ...................................... 16/253 |
| 2,808,497 | * | 10/1957 | Kesling et al. .......................... 126/42 |
| 3,064,554 | * | 11/1962 | Lamb ...................................... 126/42 |
| 3,714,937 | * | 2/1973 | Linstead .............................. 126/25 R |
| 3,915,146 | * | 10/1975 | Bauer .................................. 126/41 R |
| 4,062,340 | * | 12/1977 | Huff ................................... 126/25 R |
| 4,422,435 | * | 12/1983 | Spell .................................. 126/25 R |
| 4,759,276 | * | 7/1988 | Segroves ............................. 126/25 R |
| 4,878,477 | * | 11/1989 | McLane .............................. 126/41 R |
| 4,886,045 | * | 12/1989 | Ducate, Jr. et al. ................ 126/41 R |
| 4,909,238 | * | 3/1990 | Cassie ................................ 126/41 R |
| 5,072,718 | * | 12/1991 | Seal ................................... 126/41 R |
| 5,086,753 | * | 2/1992 | Berger ................................ 126/41 R |
| 5,355,558 | * | 10/1994 | Vertanen ............................ 126/25 R |
| 5,394,590 | * | 3/1995 | Yu ..................................... 126/25 R |
| 5,960,782 | * | 10/1999 | Clements et al. .................. 126/41 R |

* cited by examiner

Primary Examiner—James C. Yeung
(74) Attorney, Agent, or Firm—Fulwider Patton Lee & Utecht, LLP

(57) ABSTRACT

An outdoor cooking device wherein a smooth and uncluttered appearance is achieved by the concealment of the gas supply and gas flow control mechanisms when not in use. A door conceals the gas supply canister which swings outwardly for better access when the door is opened. The gas flow control and lighting mechanisms are attached to the inside surface of a panel that swings outwardly to provide access and closes flush when not in use. The cooking device additionally has a lid that is attached by a compound hinge that allows the lid to swing out of the way and downwardly to prevent accidental closure.

12 Claims, 4 Drawing Sheets

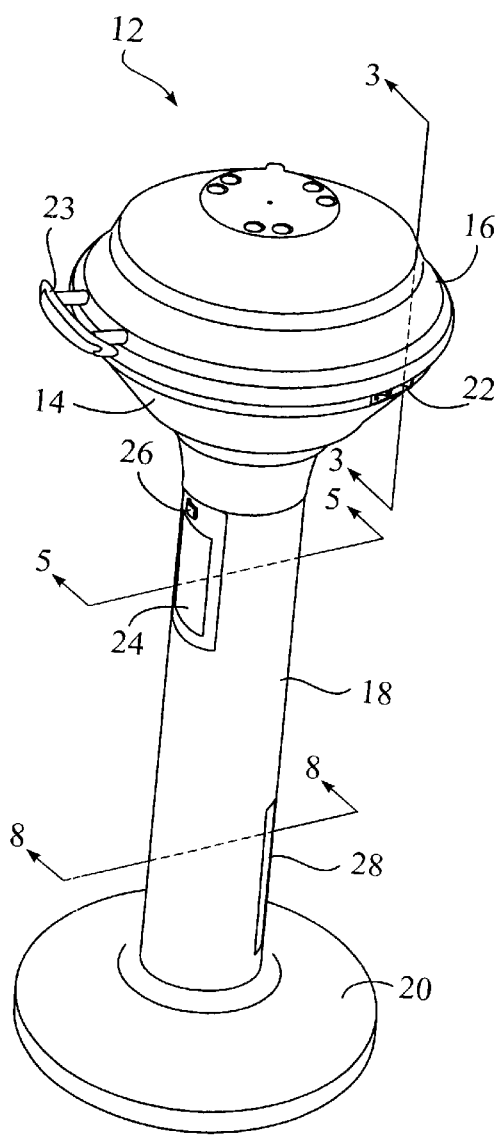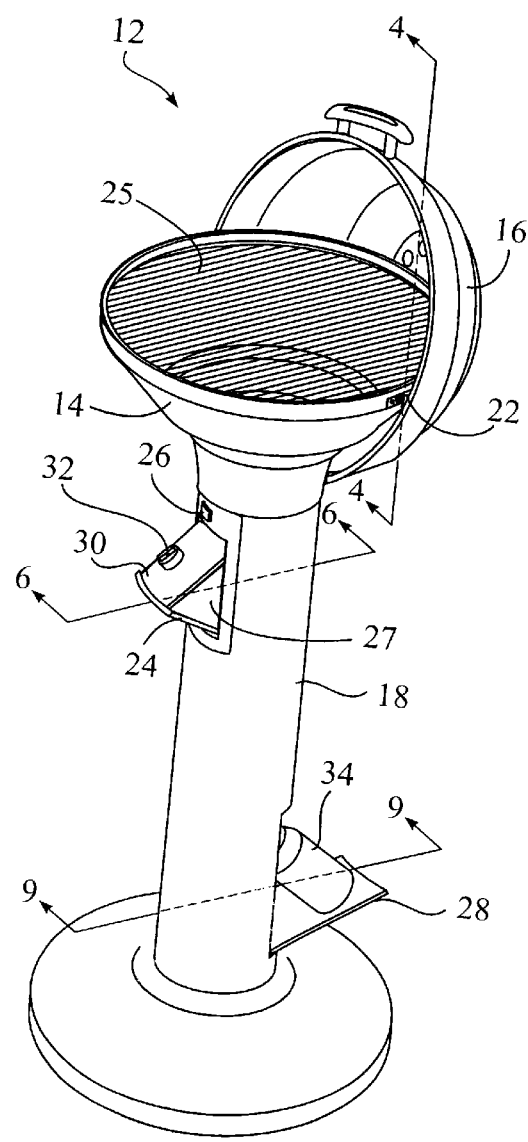
Fig. 1
Fig. 2

BARBECUE DEVICE

BACKGROUND OF THE INVENTION

The present invention generally relates to outdoor cooking appliances and more specifically pertains to barbecue-type devices that are gas-fired.

Many different types of barbecue-type devices are known which enable food to be cooked outdoors. The use of gaseous fuel such as methane, propane or butane to fire such devices is also well known and can significantly enhance the convenience of outdoor cooking. However, heretofore known gas-fired devices suffer from a number of disadvantages. As an example, the gas is typically supplied in a pressurized container, such as a refillable tank or a throw-away canister, which must be accommodated directly underneath or in close proximity to the cooking device. Such container is typically considered to be unsightly and if an effort is made to conceal its presence by for example positioning it within some type of enclosure, accessability thereto is compromised which makes it more difficult or inconvenient to change out the container when empty.

It is also necessary for a gas-fired cooking device to have some means for controlling the flow of the gas to the burner which requires the accommodation of a valve or regulator somewhere between the fuel container and the burner. Often such regulator is attached directly to the fuel container which, if the container is not concealed, adds to its unsightliness. On the other hand, if the tank is normally concealed, it must nonetheless be accessed when the barbecue is in use in order to access the gas valve. Alternatively, the regulator may be positioned remotely and while this does allow the fuel container to remain concealed at all times, a prominently positioned control mechanism could also be considered unsightly.

Finally, the manipulation of the lid of many heretofore known barbecue devices is somewhat awkward. Some such devices have a loose lid that is simply placed onto the top of the device which poses the dilemma of what to do with the lid when removed. Simply setting the lid on the ground or some available surface may not be feasible as a hot lid may cause heat damage or leave a greasy outline. A hook that is attached to the lid and is configured to engage some fixed element of the barbecue is an option but attempting to maneuver a hot lid into place while smoke obscures one's vision can also be awkward. Moreover, the lid could conceivably fall from its hooked position and cause damage or be damaged. Devices are also known in which the lid is hingedly attached directly to the barbecue device. Disadvantages associated therewith include the possibility that the lid renders while in its raised position renders the device unstable. Such instability could cause the entire device to be toppled when opened too quickly or when bumped or perhaps even when subjected to a gust of wind. Moreover, if the open lid is itself unstable, it could accidently slam shut to possibly cause injury or damage.

A gas-fired outdoor cooking device is needed that incorporates features that allow it to assume a more aesthetically pleasing appearance than heretofore known devices but that is nonetheless easy and safe to use. More specifically, all unsightly hardware associated with the fuel supply and control should be fully concealable yet easy to use and service. Additionally, a lid configuration is needed that is easy and convenient to use and that does not render the device unstable when in the open position.

SUMMARY OF THE INVENTION

The present invention provides a gas-fired outdoor cooking device that overcomes many of the shortcomings of prior art devices. More specifically, the device is configured such that all of the hardware associated with the gas supply and control mechanism is concealed, yet is easily and quickly accessible. The lid for the device is attached by a hinge configured to cause the lid to pivot about its approximate centerline. As a result, the lid is precluded from accidently slamming shut and the device as a whole is not destablitized by the lid in its open position.

The above advantages are further achieved by supporting the barbecue bowl with a hollow pedestal dimensioned to accommodate therein a replaceable gas canister and all associated plumbing for conducting and controlling the flow of gas from the canister to the burner located within the bowl clement. A hinged door near the bottom of the pedestal provides access to the canister, the replacement of which is facilitated by a pivotably mounted screw-in receiver which pivots outwardly from within the pedestal. This allows an empty canister to be removed and a new canister to be threaded into place wholly from outside the pedestal without the need to reach into the interior of the pedestal. With the canister pivoted into place within the pedestal and the hinged door in its closed position, the canister and regulator are completely hidden from sight to provide a clean and uncluttered appearance.

Additionally, the valve for controlling the flow of gas from the canister to the burner is attached to a control box that also pivots outwardly from within the pedestal. The push of a button releases the the control box to pivot outwardly and expose a control panel having a control knob positioned thereon. The knob and opening in the pedestal are configured so as to cooperate to positively prevent the control box from being pushed back into the pedestal while the knob is in any position other than the "off" position. When not in use, the box is pushed back into the pedestal to leave only its featureless front panel exposed on the surface of the pedestal to provide a smooth and uncluttered appearance.

The lid is pivotably connected to the barbecue bowl by a compound hinge that causes the lid to rotate about its approximate centerline as it is opened. The lid thereby swings into a position close to the barbecue bowl thus minimizing a shift of the center of gravity off center. As a result, the stability of the device is not substantially affected by the position of the lid. Additionally, because the center of gravity of the lid in its filly opened position is no higher than when its closed position, the lid can not possibly slam shut accidentally.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWING

FIG. 1 is perspective view of the barbecue device of the present invention in its fully closed up and stowed position;

FIG. 2 is the barbecue device of the present invention shown in FIG. 1 but in its fully deployed state;

DETAILED DESCRIPTION OF THE PREFERRED EMBODIMENT

Figure 3:
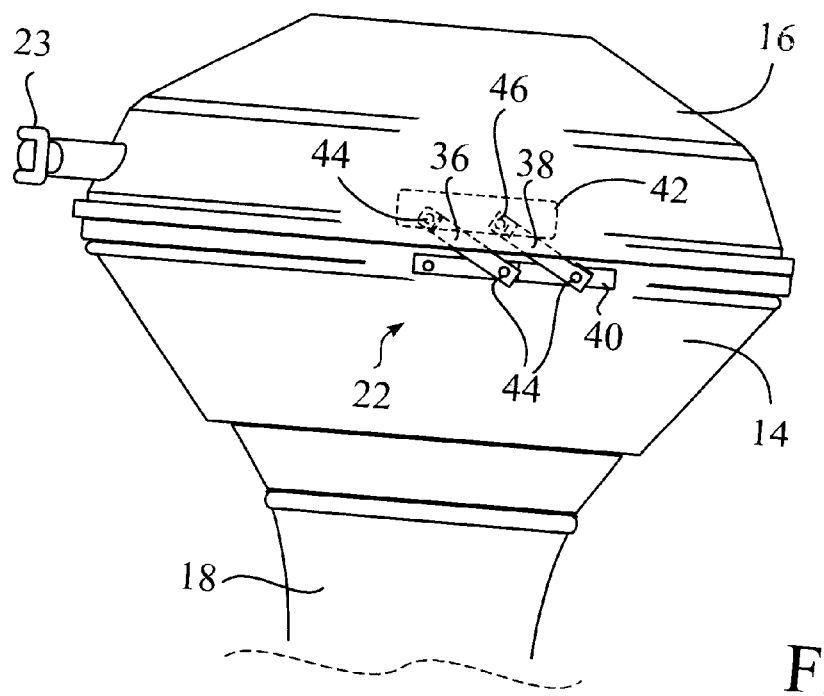
FIG. 3 is an enlarged side plan view showing the hinge mechanism taken along lines 3—3 of FIG. 1.

The present invention provides a gas-fired barbecue with features that enhance its aesthetic appearance yet render it extremely easy to use. More particularly, such features allow a clean and uncluttered look to be achieved by causing all hardware associated with the fuel supply and control to be completely concealed yet easily and quickly accessible. Additionally, the lid is hinged in such a manner so as to maintain the lid in close proximity to the device when fully opened and while in all intermediate positions. This not only prevents the device from becoming destabilized but also provides for an aesthetically pleasing appearance.

FIG. 1 is a perspective view of the barbecue device 12 of the present invention. The bowl element 14 and lid 16 are supported by an elongated pedestal 18 having an enlarged base 20. A hinge mechanism 22 interconnects the bowl and lid, while a handle 23 extends from the front of the lid. The front panel 24 of the control box is visible near the top on the front side of the pedestal while a release button 26 is positioned directly thereover.

Additionally, an access door 28 is visible near bottom of the back side of the pedestal. In its closed up and fully stowed position, a clean and uncluttered appearance is presented with no hardware associated with the fuel supply or fuel control mechanism being visible.

FIG. 2 illustrates the sanre barbecue device 12 shown in FIG. 1, but in its fully deployed state. The lid 16 is shown in its fully open position wherein the hinge mechanism 22 causes it to maintain a vertical attitude directly adjacent the barbecue bowl 14. The grill 25 is visible within the barbecue bowl. The control box 27 is shown in its "in use" position to permitting access to control panel 30 and flow control knob 32. Additionally, the access door 28 is open to allow the fuel canister 34 to pivot out from within the pedestal.

Figure 4:
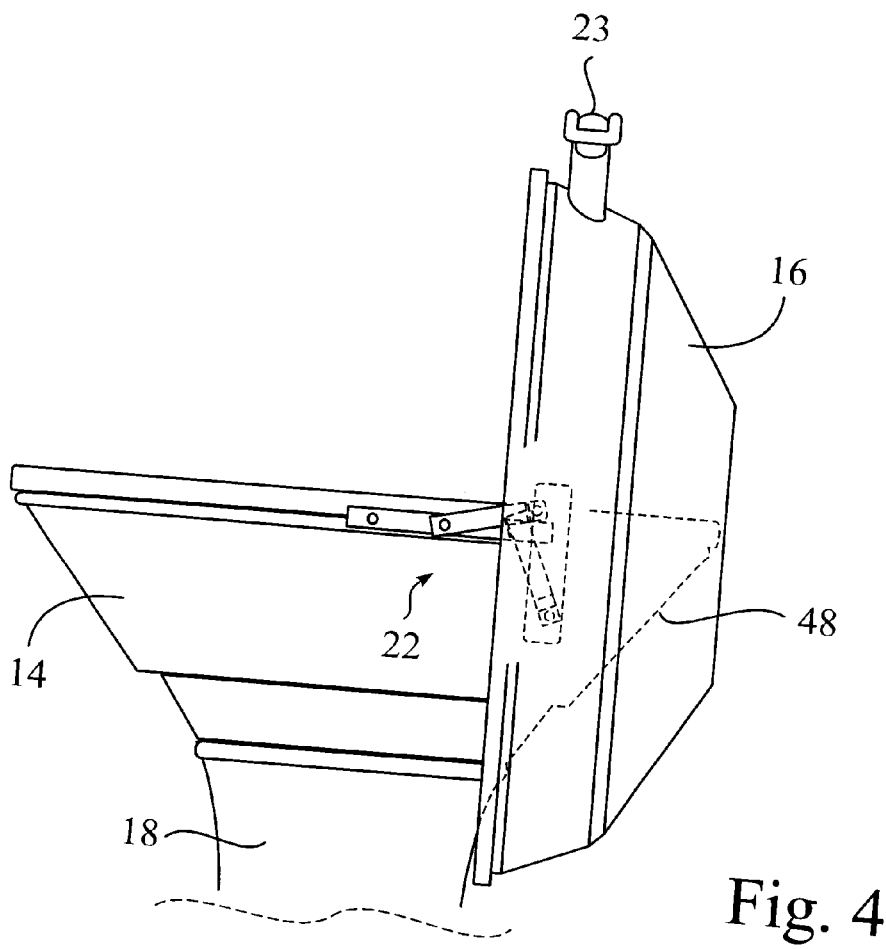
FIG. 4 is an enlarged side plan view showing the hinge mechanism taken along lines 4—4 of FIG. 2.

FIG. 3 provides more detail in relation to the compound hinge 22 employed to control the position of the lid 16. Two such hinge mechanisms, one on each side of the barbecue device, are utilized, substantially diametrically opposed to one another and hence approximately aligned along a center line of the lid. Each hinge mechanism includes a front hinge member 36 and a rear hinge member 38. A bowl bracket 40 is attached to the barbecue bowl 14, while a lid bracket 42 is attached to the lid 16. Each hinge member has a pivots 44, 46 disposed on each end which are pivotably interconnected to the respective bracket. As is visible in FIG. 4 such arrangement of elements causes the lid 16 to open to a position wherein the lid is directly adjacent the bowl 14, thereby enclosing a substantial portion thereof as is shown in the phantom outline 48. As is visible when comparing FIGS. 3 and 4, the positions of the lid side pivot points 46 are higher in the closed position (FIG. 3) than they are in the open position (FIG. 4).

Figure 6:
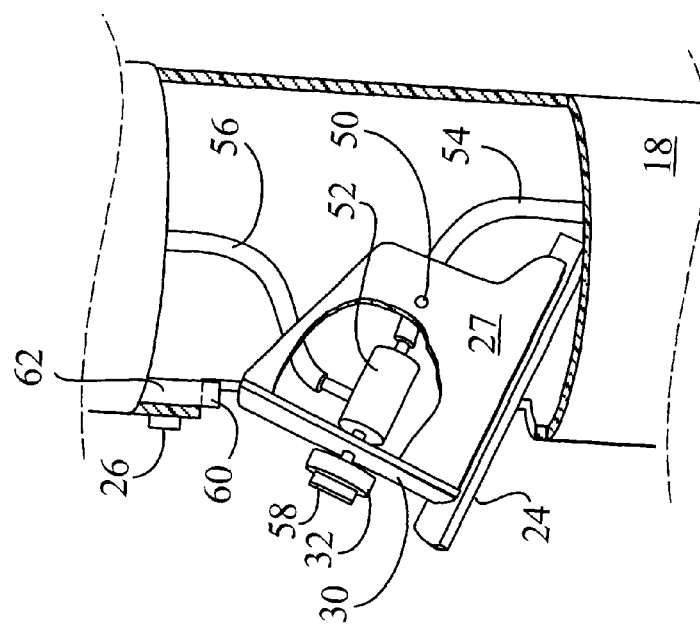
FIG. 6 is an enlarged and partially cross-sectioned view showing the control panel taken along lines 6—6 of FIG. 2.
Figure 5:
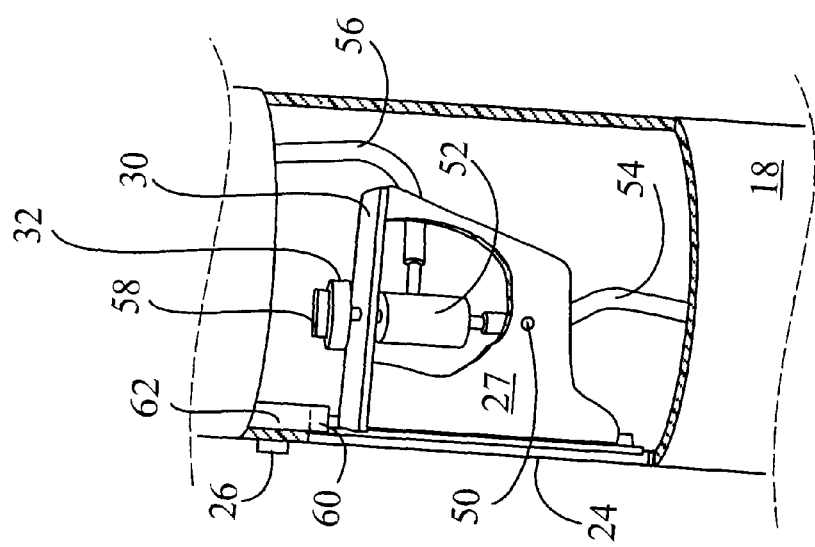
FIG. 5 is an enlarged and partially cross-sectioned view showing the control panel taken along lines 5—5 of FIG. 1.

FIGS. 5 and 6 illustrate, respectively, the control box 27 in its stowed and its open position. In FIG. 5 the front panel 24 of the control box 27 is aligned flush with the outer surface of the pedestal 18 to provide a smooth and unbroken surface. The control box 27 is supported within the pedestal by pivots 50 configured to allow the entire box to pivot outwardly from within the pedestal. In its stowed position, the control panel 30 and flow control knob 32 are completely hidden behind the front panel 24. Attached to the control panel is flow control valve 52 by which the flow of gas from the canister through supply to the burner is controlled. A supply conduit 54 sets the fuel canister into fluid communication with the regulator while a feed conduit 56 sets the valve into fluid communication with the burner located within the bowl element. Both conduits are flexible so as to allow the control box to freely pivot. The control knob 32 has a raised ridge 58 formed in its surface. A slot 60, substantially matching the c ross section of the raised ridge of the knob is formed in a gate element 62 attached to the interior of the pedestal. The knob is attached to the regulator in an orientation such that the ridge becomes aligned with the slot in the gas element only while in the knob is rotated into its off position.

FIG. 6 illustrates the control box in its deployed position. Upon release of the latch (not shown) by depression of button 26, the entire box pivots forwardly about pivots 50 to expose and provide access to the control panel 30 and flow control knob 32. The flexibility of conduits 54 and 56 ensure that the movement of the control box 27 is not restricted in any way. Once in the deployed position the knob can be rotated to control the flow of gas to the burner.

Figure 7:
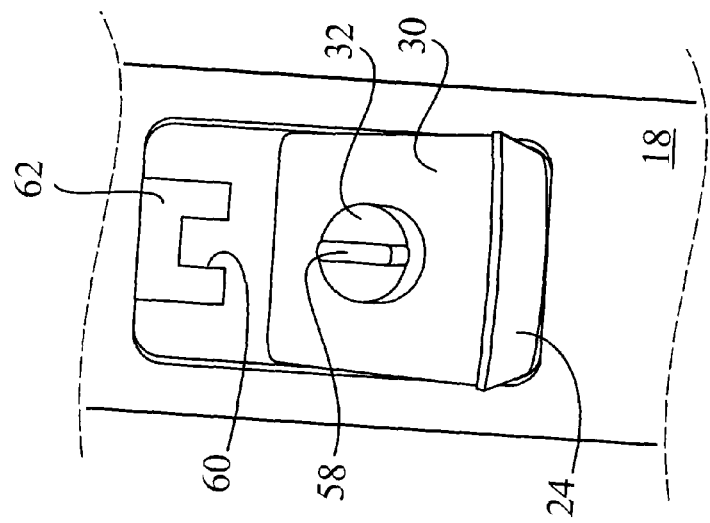
FIG. 7 is front plan view illustrating the cooperation of the control knob and pedestal opening.

FIG. 7 illustrates the cooperation between the knob 32 and gate 62 that prevents the control box 27 being closed while gas is flowing to the burner. The knob is affixed to the valve such that the raised ridge is in a vertical orientation when the flow of gas is closed off. In such orientation, the ridge 53 is able to pass through the notch 60 in gate 62. In any other rotational position, the misaligned ridge will interfere with the gate and prevent the control box from being pushed into the pedestal.

Figure 9:
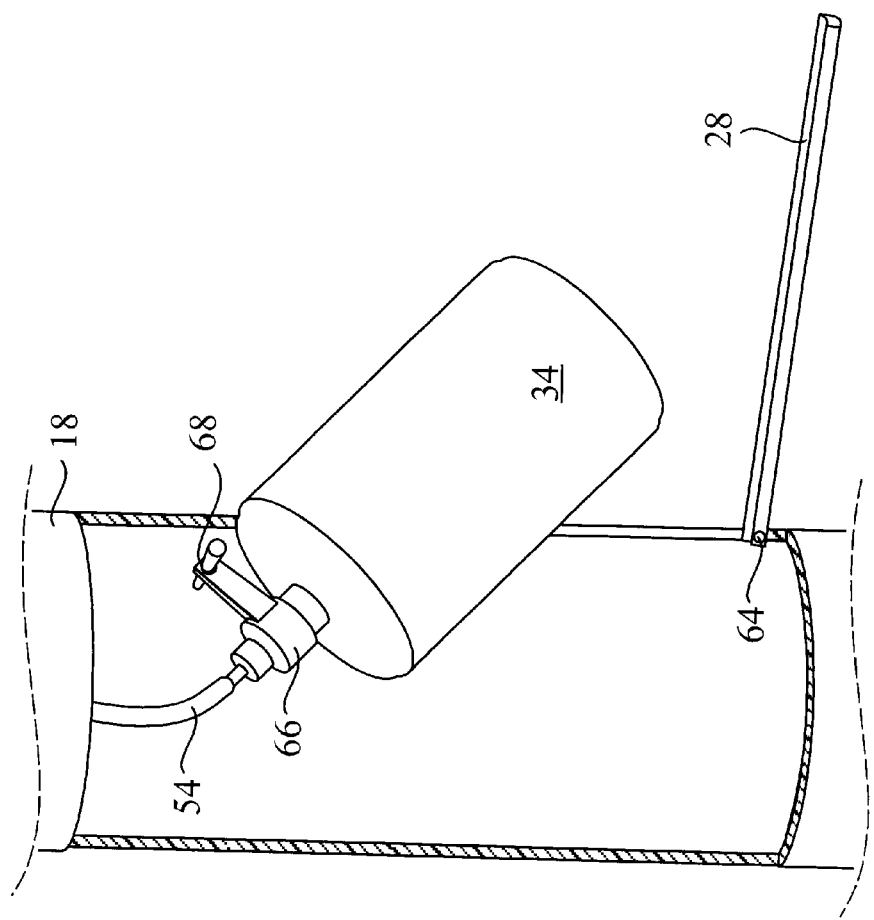
FIG. 9 is an enlarged and partially cross-sectioned view showing the fuel supply mechanism taken along lines 9—9 of FIG. 2.
Figure 8:
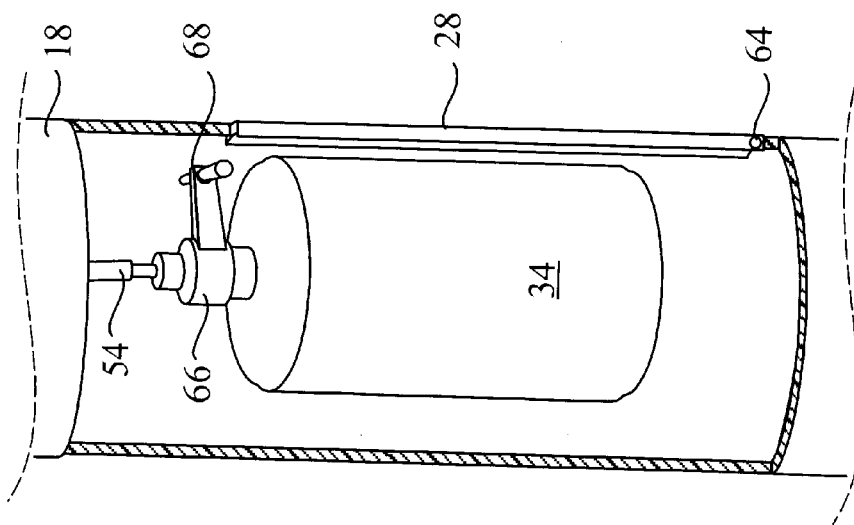
FIG. 8 is an enlarged and partially cross-sectioned view showing the fuel supply mechanism taken along lines 8—8 of FIG. 1.

FIGS. 8 and 9 illustrate the fuel canister in its stowed and accessible position respectively. Access door 28 is hinged at 64 near the base of pedestal 18. A regulator 66 is pivotably supported within the pedestal at pivot points 68. The regulator is configured to allow a fuel canister to be threaded thereonto to achieve a sealed fit. Once in place, the canister is set fluid communication with the supply conduit 54 which extends upwardly to the flow valve. When the access door is in its open position as per FIG. 9, the receiver 66 can be pivoted to thereby project the canister out beyond the confines of the pedestal.

In use, the barbecue device must first be fueled by the fitment of a fitel canister thereto. Access panel 28 is first swung outwardly to allow the receiver 66 to pivot downwardly. This allows a spent canister 34 to be firmly gripped and unscrewed from the receiver. Additionally, the downwardly pivoted receiver allows a fresh canister to be more easily introduced into the threaded receiver and rotated into place. Once in place, the canister 34 is pushed into the interior of the pedestal and the access panel 28 is swung shut to completely conceal canister and the associated plumbing hardware.

To use the barbecue device, button 26 is depressed to allow the control box 27 to pivot outwardly and provide access to the control panel 30 and associated control knob 32. Rotation of the knob controls the flow of gas through the valve 52 and hence from the fuel canister through conduits 54 and 56 to the burner within the barbecue bowl 14. The flow of gas is completely shut off when the knob is rotated to a position in which the raised ridge 58 thereon assumes a vertical orientation. Only in such position is the ridge able to pass through the notch 60 in gate 62 affixed to the edge of the opening in the pedestal. Any misalignment of the ridge with the notch causes the two elements to interfere with one another and thereby positively prevent the control box from being pushed into the pedestal. This serves a safety ftinction whereby full access to the control knob is available at all times while gas is flowing to the burner. By turning the knob off and pushing the control box into the pedestal, only the front panel 24 remains exposed to provide a clean and uncluttered appearance.

The lid of the barbecue device is opened by lifting up on handle 23. The compound hinge 22 causes the lid to pivot essentially about its centerline and thereby is maintained in close proximity to the barbecue bowl throughout its entire range of movement. Moreover, the geometry of the hinge causes the lid's center of gravity to be lowered as it is opened. As a consequence, the position of the lid does not in any way destabilize the barbecue device, nor can the lid accidently slam shut. The above described features render the barbecue device of the present invention to be safer and easier to use than previously known devices and additionally enable a more aesthetically pleasing appearance to be achieved.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A cooking device, comprising:

an enclosure;

a grill supported within said enclosure;

a gas burner positioned within said enclosure and under said grill;

a pedestal having a hollow interior for supporting said enclosure;

a removable gas canister;

a regulator element for supporting said gas canister and receiving gas from within said canister, said regulator element being pivotably attached to the interior of said pedestal and configured to pivot from a first position wherein said canister supported by said regulator element is positioned substantially outside said pedestal to a second position wherein said canister supported by said regulator element is positioned wholly within said pedestal; and a conduit for setting said regulator element into fluid communication with said burner.

2. The device of claim 1, further comprising an access door hingedly connected to said pedestal and configured to allow said canister, regulator element and conduit to be concealed when said regulator element is pivoted to said second position.

3. The cooking device of claim 1, further comprising:

a control box, having a first surface and a second surface, such second surface having attached thereto a manipulatable control element for controlling the flow of gas through said conduit, wherein said control box is pivotably attached to the interior of said pedestal and configured to pivot from a first position wherein said first surface is substantially flush with the exterior surface of said pedestal to a second position wherein said second surface is exposed and said control element is readily accessible.

4. The cooking device of claim 3, further comprising means for preventing said control box to be pivoted to its first position while gas is flowing through said conduit to said burner.

5. The cooking device of claim 3, wherein said control element comprises a rotatable knob operatively connected to a flow regulator that is disposed in line with said conduit.

6. The cooking device of claim 5, further comprising a notched gate affixed to said pedestal and said knob includes a raised ridge formed thereon which is configured to pass through said notch exclusively when aligned therewith, wherein such alignment is achieved exclusively when said knob is rotated to a position wherein all flow of gas through said conduit is precluded.

7. The cooking device of claim 3, wherein said enclosure consists of a barbecue bowl and a lid, further comprising:

a compound hinge mechanism for interconnecting said bowl and said lid, configured to cause a substantial portion of said lid to become lowered as said lid is opened.

8. The cooking device of claim 7, wherein said bowl and said lid have a substantially circular cross-section and wherein two compound hinges that interconnect said bowl and said lid are positioned at substantially diametrically opposed positions about said bowl and lid.

9. A cooking device, comprising:

a barbecue bowl;

a grill supported within said bowl;

a pedestal for supporting said bowl; and lid connected to said bowl by compound hinge mechanisms that each include two separate hinge elements that are each directly connected to said bowl on a first end and to said lid on a second end and that are configured to cause all hinge element connections to said lid to assume a lower position when said lid is open than when said lid is closed.

10. The cooking device of claim 9, wherein said bowl and said lid have a substantially circular cross-section and wherein two compound hinges interconnect said bowl and said lid, cach at a position substantially diametrically opposed to the other about said bowl and said lid.

11. The cooking device of claim 9, wherein said pedestal is hollow, further comprising:

a gas burner positioned within said bowl;

a removable gas canister;

a regulator element for supporting said gas canister and receiving gas from within said canister, said regulator clement being pivotably attached to the interior of said pedestal and configured to pivot from a first position wherein said canister supported by said receiver element projects outwardly from said pedestal to a second position wherein said canister supported by said receiver element is positioned wholly within said pedestal; and a conduit for setting said receiver into fluid communication with said burner.

12. The cooking device of claim 11, further comprising an access door hingedly connected to said pedestal and configured to allow said canister, receiver element and conduit to be concealed when said receiver element is pivoted to said second position.

* * * * *